(12) United States Patent
Zhang et al.

(10) Patent No.: US 12,334,533 B2
(45) Date of Patent: Jun. 17, 2025

(54) COATING DEVICE

(71) Applicant: CONTEMPORARY AMPEREX TECHNOLOGY (HONG KONG) LIMITED, Hong Kong (CN)

(72) Inventors: Yongli Zhang, Ningde (CN); Zhihua Wen, Ningde (CN); Keqiang Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/819,928

(22) Filed: Aug. 29, 2024

(65) Prior Publication Data
US 2024/0421280 A1    Dec. 19, 2024

Related U.S. Application Data

(63) Continuation of application No. PCT/CN2023/092364, filed on May 5, 2023.

(30) Foreign Application Priority Data

May 13, 2022    (CN) .......................... 202210517415.0

(51) Int. Cl.
*H01M 4/04* (2006.01)
*B05C 19/00* (2006.01)
*B05D 1/00* (2006.01)

(52) U.S. Cl.
CPC ......... *H01M 4/0402* (2013.01); *B05C 19/002* (2013.01); *B05D 1/007* (2013.01)

(58) Field of Classification Search
None
See application file for complete search history.

(56) References Cited

U.S. PATENT DOCUMENTS 2,889,805 A * 6/1959 Freeder ................. B05C 19/002
                                                            118/305
2,920,679 A * 1/1960 Sittel ........................ D04H 1/00
                                                            19/301

(Continued)

FOREIGN PATENT DOCUMENTS

CN      207385869 U     5/2018
CN      110355033 A    10/2019
(Continued)

OTHER PUBLICATIONS

International Search Report for PCT Application No. PCT/CN2023/092364, mailed Aug. 12, 2023.

(Continued)

*Primary Examiner* — Jethro M. Pence
(74) *Attorney, Agent, or Firm* — K&L Gates LLP

(57) ABSTRACT

A coating device for applying a coating to a member to be coated includes: a roller assembly including a first spool and second spool that are spaced apart, wherein the first spool is configured to release the member to be coated that is to be coated, and the second spool is configured to roll up the member to be coated after being coated with a coating; a coating assembly including an electrostatic roller set and an electrostatic rod, wherein the electrostatic roller set is at least partially rotatable and is configured to electrostatically adsorb the powder, the electrostatic rod is configured to provide electrostatic adsorption force to the powder on the electrostatic roller set; a composite assembly provided at downstream position of the coating assembly, and configured to connect the powder laid on the member to be coated with the member to be coated.

20 Claims, 4 Drawing Sheets

(56) References Cited

U.S. PATENT DOCUMENTS

| | | | | |
|---|---|---|---|---|
| 3,327,685 | A | * | 6/1967 | Schmitz .................. D04H 11/00 118/624 |
| 3,332,395 | A | * | 7/1967 | Heyl ..................... B05C 19/002 118/624 |
| 5,518,546 | A | * | 5/1996 | Williams ............. B05B 5/1683 427/195 |
| 5,817,374 | A | * | 10/1998 | Detig .................... B05D 5/067 427/466 |
| 6,582,521 | B2 | * | 6/2003 | Bertellotti ................ B05B 5/14 118/640 |
| 7,070,656 | B2 | * | 7/2006 | Hogan ................... B05B 5/087 118/308 |
| 7,217,444 | B2 | * | 5/2007 | Hays ..................... B05B 5/082 427/458 |
| 8,771,801 | B2 | * | 7/2014 | Moren ............... B24D 18/0072 427/470 |
| 8,869,740 | B2 | * | 10/2014 | Moren ..................... B24D 3/34 118/621 |
| 9,040,122 | B2 | * | 5/2015 | Moren ............... B24D 18/0072 427/470 |
| 9,676,078 | B2 | * | 6/2017 | Moren ...................... B05B 5/14 |
| 12,126,003 | B2 | * | 10/2024 | Song ............... B29C 66/83423 |
| 2003/0211252 | A1 | * | 11/2003 | Daniels .................... B05D 7/06 118/308 |
| 2004/0101619 | A1 | * | 5/2004 | Camorani ............. B28B 11/048 118/308 |
| 2005/0287306 | A1 | * | 12/2005 | Hays ..................... B05B 5/081 427/458 |
| 2006/0150902 | A1 | * | 7/2006 | Stelter .................... G03G 5/144 118/308 |
| 2011/0289854 | A1 | * | 12/2011 | Moren ................ B24D 11/005 118/621 |
| 2013/0312337 | A1 | * | 11/2013 | Moren ..................... B05B 5/14 118/621 |
| 2014/0209691 | A1 | * | 7/2014 | Finn ..................... H01F 27/363 235/492 |
| 2016/0038967 | A1 | * | 2/2016 | Tarasco ................... B27K 3/15 118/621 |

FOREIGN PATENT DOCUMENTS

| | | |
|---|---|---|
| CN | 113488617 A | 10/2021 |
| CN | 214600086 U | 11/2021 |
| JP | 09011654 A | 1/1997 |
| JP | 2010061917 A | 3/2010 |
| JP | 2011092915 A | 5/2011 |
| JP | 2014056840 A | 3/2014 |
| JP | 2014096306 A | 5/2014 |
| JP | 2015176842 A | 10/2015 |
| JP | 2016002493 A | 1/2016 |
| KR | 1020120040669 A | 4/2012 |
| KR | 101801253 B1 | 11/2017 |

OTHER PUBLICATIONS

Written Opinion for PCT Application No. PCT/CN2023/092364, mailed Aug. 18, 2023.

* cited by examiner

COATING DEVICE

CROSS REFERENCE TO RELATED APPLICATION

The present application is a continuation of international application No. PCT/CN2023/092364, filed on May 5, 2023, which claims priority to Chinese Patent Application No. 202210517415.0, filed on May 13, 2022. The disclosures of the aforementioned applications are hereby incorporated by reference in their entireties.

TECHNICAL FIELD

The present application relates to the technical field of battery production equipment, and in particular to a coating device.

BACKGROUND

Energy conservation and emission reduction are the key to the sustainable development of the automotive industry, and electric vehicles have become an important component of the industry's sustainable development due to their advantages in energy conservation and environmental protection. For electric vehicles, battery technology is also an important factor related to their development.

In a battery manufacturing process in a prior art, the current collector of the electrode is usually coated by wet coating. Wet coating requires baking, and during the baking process, the coating material will partially evaporate into the air, which is prone to environmental pollution. If the coating material that evaporates into the air is recycled, the coating cost will be increased.

SUMMARY

In view of the above issues, the present application provides a coating device that can ensure the forming requirements of the coating, and will not cause pollution to the environment, thereby reducing the coating cost.

In the first aspect, the present application provides a coating device for applying a coating to a member to be coated. The coating device includes a roller assembly including a first spool and a second spool that are spaced apart from each other, in which the first spool is configured to release the member to be coated that is to be coated, and the second spool is configured to roll up the member to be coated after being coated with the coating; a coating assembly arranged at a downstream position of the first spool and at an upstream position of the second spool, in which the coating assembly includes an electrostatic roller set and an electrostatic rod, the electrostatic roller set is at least partially rotatable and configured to electrostatically adsorb the powder, and the electrostatic rod is configured to provide electrostatic adsorption force to the powder on the electrostatic roller set, so that the powder is peeled off from the electrostatic roller set and laid on the member to be coated; and a composite assembly, arranged at a downstream position of the coating assembly, in which the composite assembly is configured to connect the powder laid on the member to be coated with the member to be coated to form the coating connected to the member to be coated.

The coating device provided by the embodiments of the present application includes a roller assembly, a coating assembly and a composite assembly. The first spool of the roller assembly can be configured to release the member to be coated that is to be coated, the second roll can be configured to roll up the member to be coated after being coated with a coating, the electrostatic roller set of the coating assembly can rotate and electrostatically adsorb the powder, and the electrostatic rod is configured to provide electrostatic adsorption force to the powder on the electrostatic roller set. When the member to be coated passes between the electrostatic roller set and the electrostatic rod, under the action of the electrostatic rod, the powder adsorbed on the electrostatic roller set can be peeled off from the electrostatic roller set and laid on the member to be coated. Under the action of the composite assembly, the powder laid on the member to be coated is connected to the member to be coated to form the coating connected to the member to be coated. This not only ensures the coating requirements, but also adopts the form of electrostatic coating of the powder which will not evaporate substances that pollute the air, thereby reducing the risk of environmental pollution and coating costs.

In some embodiments, the coating assembly further includes a scraper for scraping off excess powder on the electrostatic roller set.

The coating device provided by the embodiments of the present application further includes a scraper, which can scrape off the powder exceeding the predetermined thickness requirement on the electrostatic roller set and separate it from the electrostatic roller set, so as to ensure that the thickness of the powder adsorbed on the electrostatic roller set is within the predetermined thickness range. When the powder is peeled off from the electrostatic roller set and laid on the workpiece under the action of the electrostatic rod, the thickness on the member to be coated is uniform, thereby ensuring the uniform thickness of the formed coating.

In some embodiments, a gap between the scraper and the electrostatic roller set is adjustable.

In the coating device provided by the embodiments of the present application, the gap between the scraper and the electrostatic roller set can be adjustable according to the coating thickness requirements of different members to be coated by providing the scraper and making the gap between the scraper and the electrostatic roller set adjustable, thereby adapting to the coating laying requirements of different thickness requirements.

In some embodiments, the electrostatic roller set includes a charging roller and an adsorption roller. The charging roller is configured to release static electricity and make the adsorption roller carry the static electricity. The adsorption roller can rotate and be configured to electrostatically adsorb powder. A feeding gap through which the member to be coated passes is formed between the adsorption roller and the electrostatic rod.

In the coating device provided by the embodiments of the present application, by providing the electrostatic roller set including the charging roller and the adsorption roller, the charging roller can be used to obtain electric energy and release static electricity, so that the adsorption roller carries static electricity. Then, the powder is electrostatically adsorbed by the adsorption roller with static electricity. The adsorption roller can rotate and transfer the powder to the member to be coated, thereby achieving the flat laying requirement of the powder on the member to be coated.

In some embodiments, the coating assembly further includes a material box for holding the powder and the material box has an opening arranged towards the adsorption roller.

The coating device provided by the embodiment of the present application facilitates the centralized storage of the powder by providing the material box, and the material box has an opening arranged towards the adsorption roller. Under the electrostatic adsorption force of the adsorption roller, the powder in the material box can flow out through the opening and be adsorbed onto the adsorption roller. The powder is transferred to the member to be coated through the adsorption roller, thereby achieving the flat laying requirement of the powder on the member to be coated.

In some embodiments, the material box and the scraper are distributed at intervals in a circumferential direction of the adsorption roller. In a rotational direction of the adsorption roller, the material box is provided at an upstream position of the scraper.

In the coating device provided by the embodiments of the present application, the material box and the scraper are distributed at intervals in the circumferential direction of the adsorption roller, and the material box is provided at the upstream position of the scraper in the rotational direction of the adsorption roller, so as to ensure that when the adsorption roller first adsorbs the powder and then goes through the scraping process of the scraper, the thickness of the powder layer adsorbed by the adsorption roller rotating to the side where the electrostatic rod is located reaches the predetermined thickness requirement, thereby further ensuring that the thickness of the powder layer laid flat on the member to be coated is uniform.

In some embodiments, the charging roller is located at an upstream position of the material box in the rotational direction of the adsorption roller.

In the coating device provided by the embodiments of the present application, in the rotational direction of the adsorption roller, the charging roller is located at the upstream position of the material box, so that the part of the adsorption roller passing through the material box has already passed through the charging roller. Under the action of the charging roller, the adsorption roller carries sufficient electrostatic charge, and then when the adsorption roller passes through the material box, it has sufficient electrostatic adsorption capacity to adsorb the powder inside the material box to the outer circumferential surface of the adsorption roller itself.

In some embodiments, the coating assembly further includes an aggregate member, which is spaced apart from the scraper part and configured to collect the powder scraped off from the electrostatic roller set.

The coating device provided by the embodiment of the present application can collect the scraped powder by providing the aggregate member, avoiding the scraped powder from falling on the member to be coated and affecting the thickness of the coating. At the same time, the collected powder can be reused through the aggregate member, improving the utilization rate of the powder and reducing costs.

In some embodiments, both the aggregate member and the scraper part are located on the same side of the centerline of the adsorption roller, and the centerline is perpendicular to the axis of the adsorption roller and passes through the center of the adsorption roller.

In the coating device provided by the embodiments of the present application, through the above setting, the scraped powder can fall to the aggregate member under the action of gravity, thereby facilitating the collection of the powder.

In some embodiments, the coating device further includes a material removal member for removing residual powder on the adsorption roller. In the rotational direction of the adsorption roller, the material removal member is provided at a downstream position of the electrostatic roller and abuts against the adsorption roller.

In the coating device provided by the embodiments of the present application, through the above setting, the powder adsorbed on the adsorption roller is peeled off from the adsorption roller under the electrostatic action of the electrostatic roller and laid flat on the member to be coated. If there is still some remaining powder that has not been peeled off by the adsorption roller under the action of the electrostatic roller, it can be scraped off by the material removal member and collected through the collection box so as to ensure the cleanliness of the corresponding position of the adsorption roller that passes through the material box again, thereby improving the uniformity of the thickness of the applied coating.

In some embodiments, the number of coating assemblies is two or more groups, at least one group of coating assembly is configured to apply the powder to one surface of the member to be coated in the thickness direction, and at least one group of coating assembly is configured to apply the powder to the other surface of the member to be coated in the thickness direction.

In the coating device provided by the embodiments of the present application, by providing the coating assembly including two or more groups, the powder can be applied on different surfaces of the member to be coated, thereby facilitating the formation of a double-layer coating on the member to be coated.

In some embodiments, the coating device further includes a plurality of reversing rollers for bending the member to be coated to form at least a first section and a second section that are spaced apart from each other and arranged in parallel. The plurality of reversing rollers are distributed at intervals along a predetermined trajectory. At least one group of coating assembly is located between the first section and the second section and configured to apply the powder to the surface of the first section on the side facing the second section, and at least one group of coating assembly is located on the side of the second section away from the first section and configured to apply the powder to the surface of the second section away from the first section.

In the coating device provided by the embodiments of the present application, by providing a plurality of reversing rollers and limiting the position setting of the plurality of coating assemblies, the coating device facilitates the laying of powder on two different surfaces of the member to be coated, and facilitates the formation of a double-layer coating.

In some embodiments, the composite assembly includes an oven and an extrusion roller. The oven is configured to heat the member to be coated and the powder laid on the member to be coated so that the powder is thermally compounded with the member to be coated. The extrusion roller set is provided at a downstream position of the oven, and the extrusion roller set is configured to extrude the member to be coated and the powder after being thermally compounded.

The above description is only a summary of the technical solutions of the present application. In order to understand the technical means in the present application more clearly, it can be implemented in accordance with the content of the specification; and in order to make the above and other objectives, features and advantages of the present application more obvious and easier to understand, and the specific embodiments of the present application are cited below.

BRIEF DESCRIPTION OF THE DRAWINGS

Other advantages and benefits will become apparent to those of ordinary skill in the art by reading detailed description of the preferred embodiments below. The accompanying drawings are only used to illustrate the preferred embodiments and are not considered as a limitation on the present application. Throughout the accompanying drawings, the same reference numerals represent the same components. In the drawings.

Figure 1:
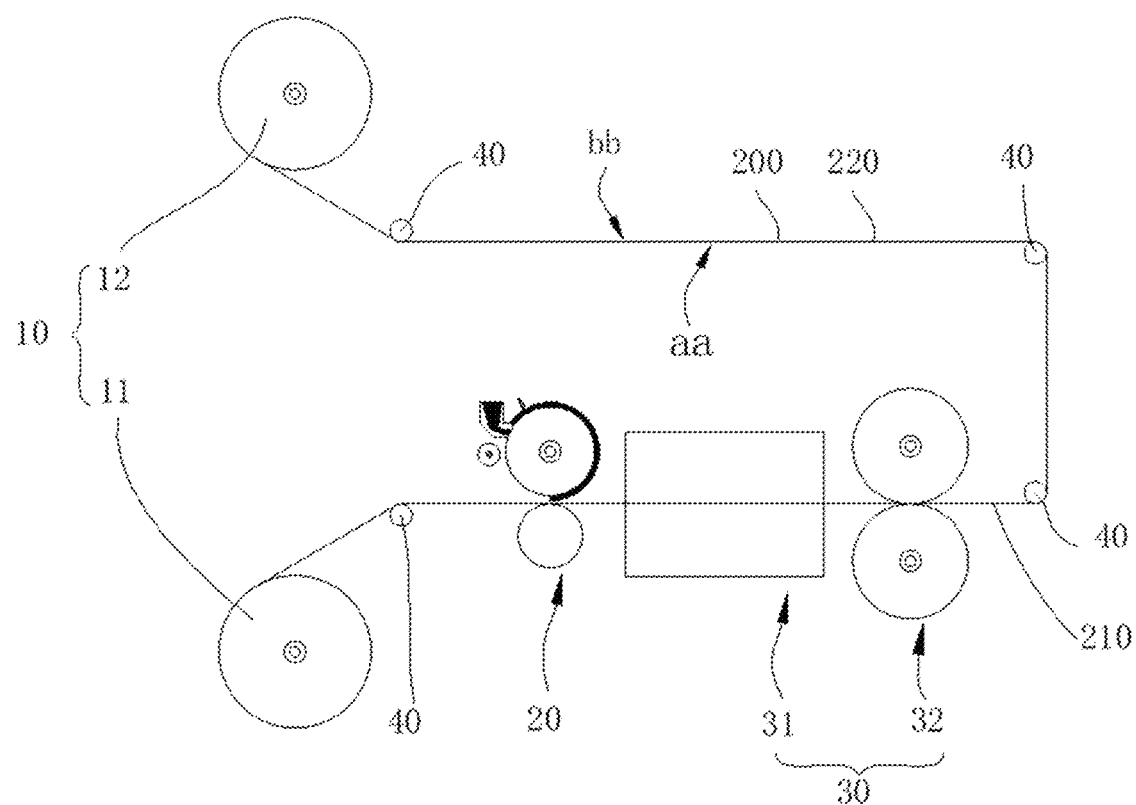
FIG. 1 is a structural schematic diagram of a coating device according to an embodiment of the present application.

The reference numerals in the specific embodiments are as follows:
10—roller assembly; 11—first spool; 12—second spool;
20—coating assembly; 21—electrostatic roller set; 211—charging roller; 212—adsorption roller; 22—electrostatic rod; 23—scraper; 24—material box; 241—opening; 25—aggregate member; 26—material removal member;
30—composite assembly; 31—oven; 32—extrusion roller;
40—reversing roller;
200—member to be coated; 210—first section; 220—second section; aa—first surface; bb—second surface; cc—centerline.
300—powder.

DETAILED DESCRIPTION

The embodiments of the technical solutions of the present application will be described in detail below with reference to the accompanying drawings. The following embodiments are only used to illustrate the technical solutions of the present application more clearly, and therefore are only examples and cannot be used to limit the protection scope of the present application.

It should be noted that, unless otherwise specified, the technical or scientific terms used in the embodiments of the present application shall have the ordinary meaning understood by those skilled in the art to which the embodiments of the present application belong.

In the description of the embodiments of the present application, an orientation or positional relationship indicated by the technical term "center", "longitudinal", "transverse", "length", "width", "thickness", "upper", "lower", "front", "back", "left", "right", "vertical", "horizontal", "top", "bottom", "internal", "external", "clockwise", "counterclockwise", "axial direction", "radial direction", "circumferential direction", or the like is based on an orientation or positional relationship shown in the accompanying drawings, and is merely for ease of describing the embodiments of the present application and simplifying the description, but does not indicate or imply that an apparatus or an element referred to must have a specific orientation or be constructed and operated in a specific orientation, and therefore cannot be understood as a limitation on the embodiments of the present application.

In addition, the technical terms "first", "second", etc. are only for the sake of description, and cannot be understood as indicating or implying the relative importance or implicitly indicating the quantity of technical features indicated. In the description of the embodiments of the present application, the meaning of "a plurality of" is two or more, unless otherwise specifically defined.

In the description of the embodiments of the present application, unless otherwise explicitly specified and defined, the technical terms "mounted", "connected", "connection", "fixed", etc. should be understood in a broad sense, for example, the "connection" may be fixed connection, detachable connection, integration, mechanical connection, electrical connection, direct connection, indirect connection via an intermediate medium, internal communication between two elements, or interaction between two elements. Those of ordinary skill in the art may appreciate the specific meanings of the foregoing terms in the embodiments of the present application according to specific circumstances.

In the description of the embodiments of the present application, unless otherwise expressly specified and defined, a first feature "above" or "below" a second feature indicates that the first feature and the second feature are in direct contact, or are in indirect contact through an intermediate medium. Moreover, the first feature "on", "above", and "up" the second feature may be the first feature right above or obliquely above the second feature, or merely indicates that the level of the first feature is higher than that of the second feature. The first feature "below", "under", and "down" the second feature may be the first feature right below or obliquely below the second feature, or merely indicates that the level of the first feature is lower than that of the second feature.

At present, in view of the development of the market situation, use of power batteries is increasingly widespread. Power batteries are not only used in energy storage power systems such as hydropower, firepower, wind power, and solar power plants, but also widely used in electric vehicles such as electric bicycles, electric motorcycles, and electric vehicles, as well as in various fields such as military equipment and aerospace. With the continuous expansion of the application fields of power batteries, their market demand is also increasing.

The power battery referred to in the embodiments of the present application refers to a single physical module including one or more battery cells to provide higher voltage and capacity. For example, the batteries mentioned in the present application may include battery modules or battery packs, etc. A battery generally includes a case body for encapsulating one or more battery cells. The case body can prevent liquids or other foreign objects from affecting the charging or discharging of battery cells.

The battery cell includes an electrode assembly and an electrolyte, and the electrode assembly includes a positive electrode plate, a negative electrode plate, and a separator. The battery cell mainly relies on metal ions moving between the positive electrode plate and negative electrode plate to operate. The positive electrode plate includes a positive electrode current collector and a positive electrode active substance layer. The positive electrode active substance layer is applied on the surface of the positive electrode current collector. The positive electrode current collector includes a positive electrode current collecting portion and a positive electrode tab connected to the positive electrode current collecting portion. The positive electrode current collecting portion is coated with the positive electrode active substance layer and the positive electrode tab is not coated with the positive electrode active substance layer. Taking the lithium-ion battery as an example, the material for the positive electrode current collector can be aluminum and the positive electrode active substance layer includes a positive electrode active substance. The positive electrode active substance can be lithium cobalt oxide, lithium iron phosphate, ternary lithium, or lithium manganese oxide, etc. The negative electrode plate includes a negative electrode current collector and a negative electrode active substance layer. The negative electrode active substance layer is applied on the surface of the negative electrode current collector. The negative electrode current collector includes a negative electrode current collecting portion and a negative electrode tab connected to the negative electrode current collecting portion. The negative electrode current collecting portion is coated with the negative electrode active substance layer and the negative electrode tab is not coated with the positive electrode active substance layer. The material for the negative electrode current collector can be copper and the negative electrode active substance layer includes a negative electrode active substance. The negative electrode active substance can be carbon or silicon, etc. The material of the separator can be PP (polypropylene) or PE (polyethylene), etc.

The inventors noticed that when the positive current collector and the negative electrode current collector of the electrode assembly in a prior art are coated with the active substance layer, they both are coated by wet coating. The wet coating involves that the corresponding active substance material is mixed with the corresponding organic solvent, and then is applied to the member to be coated such as the positive electrode current collector and the negative electrode current collector by directly coating or squeezing coating. This manner requires a long baking device to bake the member to be coated after being coated to remove organic solvents and moisture from the active substance material. If the organic solvents that are baked out are not recycled and are directly discharged into the air, air pollution will be caused. If the organic solvents that are baked out are recycled, the cost for users will be increased.

In order to solve the problems such as the environmental pollution and high cost caused by wet coating in the coating device in the prior art, the applicants made a research and found that the coating device can adopt the manner of electrostatic coating to apply the powder to the member to be coated, so as to form the required coating.

Based on the above considerations, the inventors have made in-depth research and designed a new coating device. The coating device can ensure the coating requirements without causing environmental pollution and can reduce coating costs.

Figure 2:
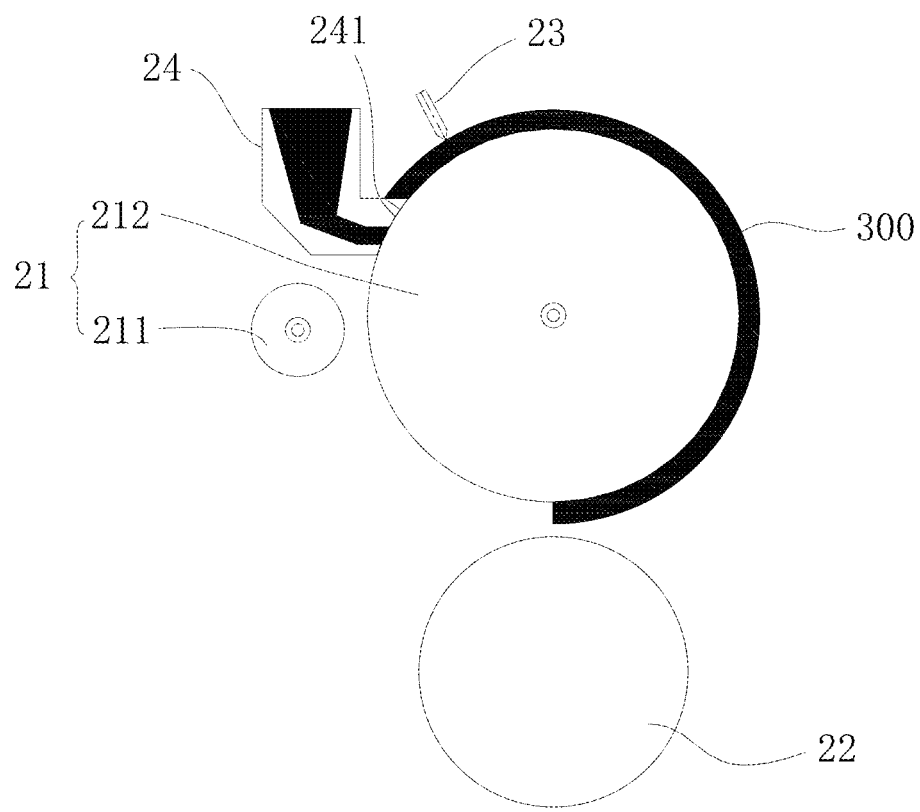
FIG. 2 is a structural schematic diagram of a coating assembly according to an embodiment of the present application.

As shown in FIGS. 1 and 2, FIG. 1 is a structural schematic diagram of the coating device according to an embodiment of the present application, and FIG. 2 is a structural schematic diagram of the coating assembly according to an embodiment of the present application.

The present application provides a coating device for applying a coating to a member to be coated 200. The coating device includes a roller assembly 10, a coating assembly 20 and a composite assembly 30. The roller assembly 10 includes a first spool 11 and a second spool 12 that are spaced apart from each other. The first spool 11 is configured to release the member to be coated 200 that is to be coated, and the second spool 12 is configured to roll up the member to be coated 200 after being coated with the coating. The coating assembly 20 is provided at a downstream position of the first spool 11 and at an upstream position of the second spool 12. The coating assembly 20 includes an electrostatic roller set 21 and an electrostatic rod 22. The electrostatic roller set 21 is at least partially rotatable and configured to electrostatically adsorb the powder 300. The electrostatic rod 22 is configured to provide an electrostatic adsorption force to the powder 300 on the electrostatic roller set 21, so that the powder 300 is peeled off from the electrostatic roller set 21 and laid on the member to be coated 200. The composite assembly 30 is provided at a downstream position of the coating assembly 20 and is configured to connect the powder 300 laid on the member to be coated 200 with the member to be coated 200 to form the coating connected to the member to be coated 200.

In some embodiments, the member to be coated 200 may be a component with a predetermined length that requires to be coated with a coating, and may be a strip. For example, the member to be coated 200 may be a positive electrode current collector, a negative electrode current collector, or the like.

In some embodiments, a current collector (such as a positive electrode or negative electrode current collector) not only is used to carry active substances, but also gathers electrons generated by electrochemical reactions and guides them to the external circuit, thereby achieving the process of converting chemical energy into electrical energy. For example, the current collector can be a metal foil such as copper foil, aluminum foil or the like.

In some embodiments, the first spool 11 and the second spool 12 can be shaft type of parts that rotate around their own axis respectively. The first spool 11 and the second spool 12 can be spaced apart from each other. In some embodiments, the first spool 11 and the second spool 12 can be spaced apart from each other and are arranged in parallel.

In some embodiments, the coating assembly 20 is arranged at the downstream position of the first spool 11 and at the upstream position of the second spool 12. It can be understood that the member to be coated released by the first spool 11 first passes through the coating assembly 20 and then passes the second spool 12.

In some embodiments, the electrostatic roller set 21 can utilize the static electricity to adsorb the powder 300, and the electrostatic roller set 21 and the electrostatic rod 22 can be spaced apart from each other to form a feeding gap through which the member to be coated 200 passes.

In some embodiments, the composite assembly 30 can act on the member to be coated 200 and the powder 300 laid on the member to be coated 200 by means of extrusion, heating, etc., so that the powder 300 is connected to the member to be coated 200 under heating or extrusion pressure.

In some embodiments, the terms "upstream" and "downstream" mentioned above and below in the present application refer to the order of production of the coating device, rather than limiting the spatial position between the components.

In the coating device provided by the embodiment of the present application, the first spool 11 of the roller assembly 10 can be configured to release the member to be coated 200 that is to be coated, the second roller 12 can be configured to roll up the member to be coated 200 after being coated with a coating, the electrostatic roller set 21 of the coating assembly 20 can rotate and electrostatically adsorb the powder 300, and the electrostatic rod 22 is configured to provide an electrostatic adsorption force to the powder 300 on the electrostatic roller set 21. When the member to be coated 200 passes between the electrostatic roller set 21 and the electrostatic rod 22, under the action of the electrostatic rod 22, the powder 300 adsorbed on the electrostatic roller set 21 can be peeled off from the electrostatic roller set 21 and laid on the member to be coated 200. By the action of the composite assembly 30, the powder 300 laid on the member to be coated 200 is connected to the member to be coated 200 so as to form the coating connected to the member to be coated 200, which ensures the coating requirements. At the same time, electrostatic coating of the powder 300 is adopted, which does not require mixing organic solvents and does not evaporate substances that pollute the air even when heated, thereby reducing the risk of environmental pollution. Additionally, there is no need to install large baking equipment or volatile substance recovery equipment, which can effectively reduce coating costs.

As an optional embodiment, in the coating device provided by the embodiment of the present application, the coating assembly 20 further includes a scraper 23 for scraping off excess powder 300 on the electrostatic roller set 21.

In some embodiments, the excess powder 300 can be understood as the powder 300 on the electrostatic roller set 21 that exceeds the predetermined thickness. For example, if a 3 mm thick powder 300 is required on the electrostatic roller set 21, during electrostatic adsorption, when there is more than 3 mm powder 300 in the electrostatic roller set 21, the powder 300 that exceeds 3 mm is scraped off by the scraper 23, so that the electrostatically adsorbed powder 300 at various locations on the electrostatic roller set 21 remains at a thickness of 3 mm.

In some embodiments, there is a predetermined distance between the scraper 23 and the electrostatic roller set 21, which can be understood as a thickness of the powder 300 that is needed for the electrostatic adsorption on the electrostatic roller set 21.

In some embodiments, the relative position between the scraper 23 and the electrostatic roller set 21 can be in a fixed form. Of course, in some other examples, the relative position between the scraper 23 and the electrostatic roller set 21 can be in an adjustable form.

In some embodiments, the scraper 23 can adopt a structural body such as a scraping knife and scraping blade that extends in an axial direction of the electrostatic roller set 21.

In the coating device provided by the embodiment of the present application, by the coating assembly further including a scraper 23, the powder 300 exceeding the predetermined thickness requirement on the electrostatic roller set 21 can be scraped off and separated from the electrostatic roller set 21 by the scraper 23, thereby ensuring that the thickness of the powder 300 adsorbed on the electrostatic roller set 21 is within the predetermined thickness range. When the powder 300 is peeled off from the electrostatic roller set 21 under the action of the electrostatic rod 22 and is laid on the member to be coated 200, the thickness on the member to be coated 200 is uniform, thereby ensuring that the thickness of the formed coating is uniform.

As an optional embodiment, in the coating device provided by the embodiment of the present application, a gap between the scraper 23 and the electrostatic roller set 21 is adjustable.

That is to say, the relative position between the scraper 23 and the electrostatic roller set 21 can be adjusted.

In some embodiments, the scraper 23 can be connected to a guide rail and movable on the guide rail, thereby adjusting the gap between the scraper 23 and the electrostatic roller set 21. When the gap between the scraper 23 and the electrostatic roller set 21 meets the predetermined requirements, the relative position between the scraper 23 and the electrostatic roller set 21 can be fixed by a locking member such as a bolt, a locking pin or the like, thereby maintaining the adjusted gap between the scraper 23 and the electrostatic roller set 21.

In the coating device provided by the embodiment of the present application, by providing the scraper 23 and making the gap between the scraper 23 and the electrostatic roller set 21 adjustable, the gap between the scraper 23 and the electrostatic roller set 21 can be adjusted according to the thickness requirements of the coating of different members to be coated 200, thereby adapting to the laying requirements of the coating of different thicknesses.

As an optional embodiment, in the coating device provided by the embodiment of the present application, the electrostatic roller set 21 includes a charging roller 211 and an adsorption roller 212. The charging roller 211 is configured to release static electricity and make the adsorption roller 212 carry the static electricity. The adsorption roller 212 can rotate and be configured to electrostatically adsorb the powder 300. A feeding gap through which the member to be coated 200 passes is formed between the adsorption roller 212 and the electrostatic rod 22.

In some embodiments, the charging roller 211 can be connected to an external power source to obtain electrical energy and release static electricity through the external power source.

In some embodiments, the charging roller 211 and the adsorption roller 212 are spaced apart from each other without any specific limitation for the spacing therebetween, thereby ensuring that interference with the rotation of the adsorption roller 212 can be avoided and meanwhile ensuring the static electricity requirements of the adsorption roller 212.

In some embodiments, the adsorption roller 212 can be a shaft type of component that rotates around its own axis.

In some embodiments, the value of the feeding gap formed between the adsorption roller 212 and the electrostatic rod 22 can be set according to the thickness of the member to be coated 200.

In the coating device provided by the embodiment of the present application, by providing the electrostatic roller set 21 including a charging roller 211 and an adsorption roller 212, the charging roller 211 can be used to obtain electric energy and release static electricity, so that the adsorption roller 212 carries static electricity. Then, the powder 300 is absorbed by the adsorption roller 212 with static electricity, the adsorption roller 212 can rotate and transfer the powder 300 to the member to be coated 200 through the adsorption roller 212, thereby achieving the flat laying requirement of the powder 300 on the member to be coated 200.

In some optional embodiments, the coating assembly 20 further includes a material box 24 for holding the powder 300. The material box 24 is provided with an opening 241 arranged towards the adsorption roller 212.

In some embodiments, the opening 241 of the material box 24 is arranged towards the adsorption roller 212. Under the electrostatic adsorption force of the adsorption roller 212, the powder 300 in the material box 24 can flow out through the opening 241 and can be adsorbed onto the adsorption roller 212.

The coating device provided by the embodiment of the present application facilitates the centralized storage of the powder 300 by providing a material box 24, and the material box 24 is provided with the opening 241 arranged towards the adsorption roller 212. Under the electrostatic adsorption force of the adsorption roller 212, the powder 300 in the material box 24 can flow out through the opening 241 and can be adsorbed onto the adsorption roller 212. The powder 300 is transferred to the member to be coated 200 through the adsorption roller 212, thereby achieving the flat laying requirement of the powder 300 on the member to be coated 200.

In some optional embodiments, the material box 24 and the scraper 23 are distributed at intervals in a circumferential direction of the adsorption roller 212. In the rotational direction of the adsorption roller 212, the material box 24 is provided at an upstream position of the scraper 23.

In some embodiments, the rotational direction can be understood as the clockwise direction when the adsorption roller 212 rotates clockwise in the circumferential direction and can be understood as the counterclockwise direction when the adsorption roller 212 rotates counterclockwise in the circumferential direction.

In the coating device provided by the embodiment of the present application, the material box 24 and the scraper 23 are spaced apart from each other in the circumferential direction of the adsorption roller 212, and in a rotational direction of the adsorption roller 212, the material box 24 is provided at the upstream position of the scraper 23, so that the adsorption roller 212 adsorbs the powder 300 firstly, and then proceeds to the scraping process through the scraper 23, thereby ensuring the thickness of the powder 300 adsorbed by the adsorption roller 212 rotating to the side where the electrostatic rod 22 is located reaches the predetermined thickness requirement, further ensuring that the thickness of the powder 300 laid flat on the member to be coated 200 is uniform.

In some optional embodiments, the charging roller 211 is located at an upstream position of the material box 24 in the rotational direction of the adsorption roller 212.

In some embodiments, taking the rotational direction of the adsorption roller 212 being a clockwise direction of its rotation as an example, in the rotational direction, the charging roller 211 and the material box 24 are sequentially distributed in the clockwise direction.

In the coating device provided by the embodiment of the present application, in the rotational direction of the adsorption roller 212, the charging roller 211 is located at the upstream position of the material box 24, so that the part of the adsorption roller 212 that passes through the material box 24 has already passed through the charging roller 211 first. Under the action of the charging roller 211, the adsorption roller 212 carries sufficient electrostatic charge. Then, when passing through the material box 24, the adsorption roller 212 has sufficient electrostatic adsorption capacity to adsorb the powder 300 inside the material box 24 to the outer circumferential surface of the adsorption roller 212 itself.

Figure 3:
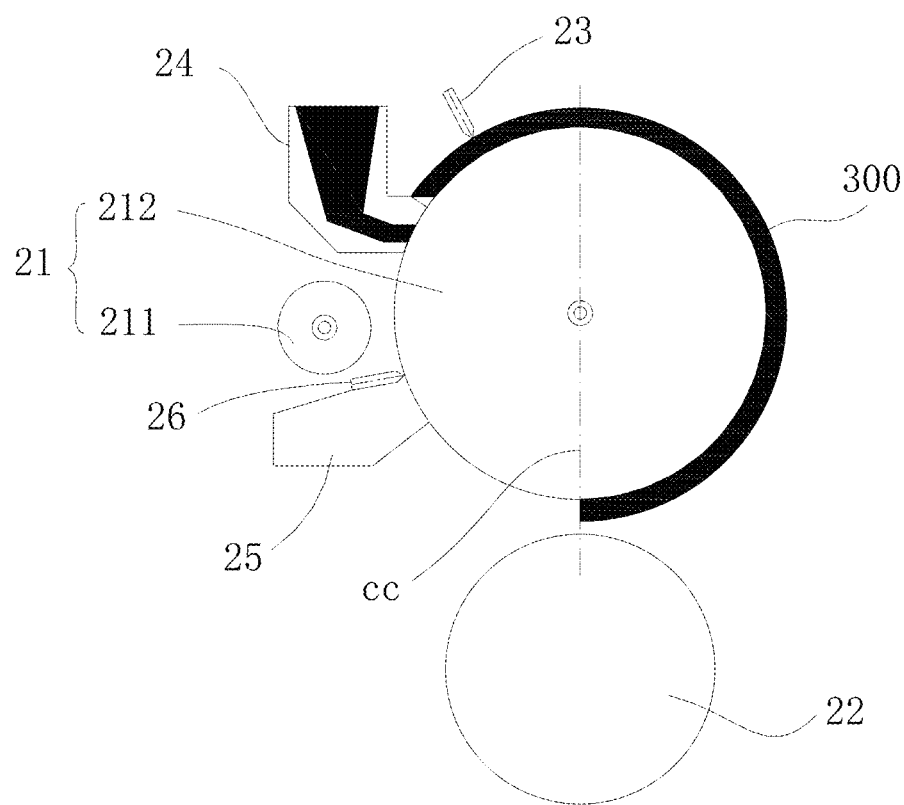
FIG. 3 is a structural schematic diagram of a coating assembly according to another embodiment of the present application.

Please refer to FIG. 3, which is a structural schematic diagram of the coating assembly 20 in another embodiment of the present application. In some optional embodiments, in the coating device provided by the embodiment of the present application, the coating assembly 20 further includes an aggregate member 25, which is spaced apart from the scraper 23 and configured to collect the powder 300 scraped off from the electrostatic roller set 21.

In some embodiments, the aggregate member 25 may include a collection box for holding and collecting the powder 300 scraped off by the scraper 23.

In the coating device provided by the embodiment of the present application, the scraped powder 300 can be collected by the aggregate member 25, thereby avoiding the scraped powder 300 from falling on the member to be coated 200 and affecting the thickness of the coating. At the same time, the collected powder 300 can be reused through the aggregate member 25, thereby improving the utilization rate of the powder 300 and reducing costs.

In some embodiments, both the aggregate member 25 and the scraper 23 are located on the same side of the centerline cc of the adsorption roller 212, which is perpendicular to the axis of the adsorption roller 212 and passes through the center of the adsorption roller 212.

Through the above setting, the scraped powder 300 can fall onto the aggregate member 25 under the action of gravity, which is conducive to the collection of the powder 300.

In some optional embodiments, the coating device provided by the embodiment of the present application further includes a material removal member 26 for removing residual powder 300 on the adsorption roller 212, which is provided at a downstream position of the electrostatic rod in the rotational direction of the adsorption roller 212 and abuts against the adsorption roller 212.

In some embodiments, the material removal member 26 may include a sheet-like structure extending along the circumferential direction of the adsorption roller 212, such as a scraping knife or a scraping blade.

Through the above setting, the powder 300 adsorbed on the adsorption roller 212 is peeled off from the adsorption roller 212 under the electrostatic action of the electrostatic rod 22 and laid flat on the member to be coated 200. If there is still some remaining powder 300 that has not been peeled off by the adsorption roller 212 under the action of the electrostatic rod 22, it can be scraped off by the material removal member 26 and collected through the material box 24 to ensure the cleanliness of the corresponding position of the adsorption roller 212 that passes through the material box 24 again, thereby improving the uniformity of the thickness of the applied coating.

Figure 4:
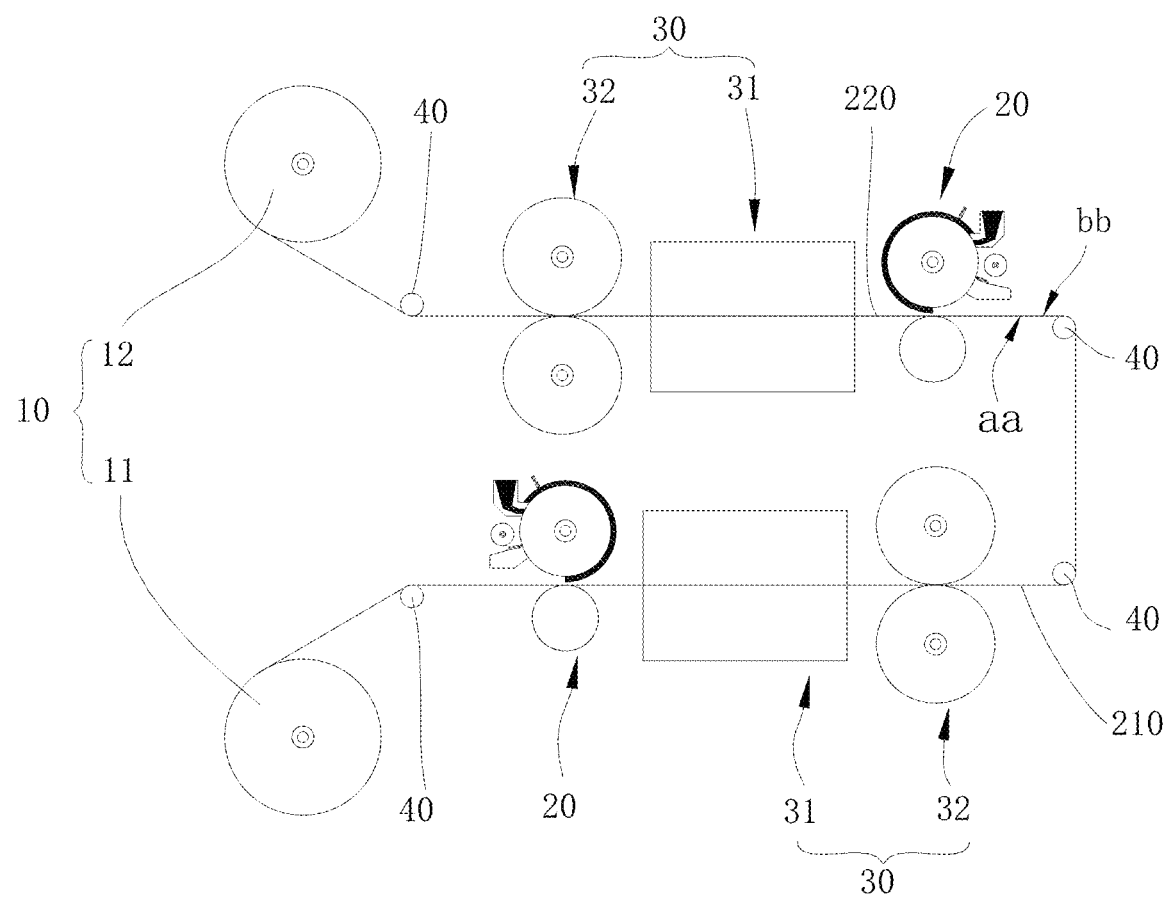
FIG. 4 is a structural schematic diagram of a coating device according to another embodiment of the present application.

Please refer to FIG. 4, which is a structural schematic diagram of a coating device in another embodiment of the present application. In some optional embodiments, the number of coating assemblies 20 is two or more groups, at least one group of the coating assembly 20 is configured to apply the powder 300 to one surface of the member to be coated 200 in the thickness direction, and at least one group of the coating assembly 20 is configured to apply the powder 300 to the other surface of the member to be coated 200 in the thickness direction.

In some embodiments, the coating assembly 20 may have a first surface aa and a second surface bb in its own thickness direction, both of which require to apply the powder 300 to form a coating.

In some embodiments, the number of coating assemblies 20 can be two groups, one group for applying the powder 300 to the first surface aa, and the other group for applying the powder 300 to the second surface bb. Of course, in some embodiments, the number of coating assemblies 20 can also be more than two groups, and the number of coating assemblies 20 corresponding to the first surface aa or the second surface bb can be more than two groups.

In the coating device provided by the embodiment of the present application, the coating assembly 20 includes two or more groups, so as to apply the powder 300 on different surfaces of the member to be coated 200, thereby facilitating the formation of a double-layer coating on the member to be coated 200.

In some optional embodiments, the coating device further includes a plurality of reversing rollers 40, which are distributed at intervals along a predetermined trajectory. The plurality of reversing rollers 40 are configured to bend the member to be coated 200 to form at least a first section 210 and a second section 220 that are spaced apart from each other and arranged in parallel. At least one group of coating assembly 20 is located between the first section 210 and the second section 220 and is configured to apply the powder 300 to the surface of the first section 210 on the side facing the second section 220. At least one group of coating assembly 20 is located on the side of the second section 220 away from the first section 210 and is configured to apply the powder 300 to the surface of the second section 220 away from the first section 210.

In some embodiments, the number of the reversing rollers 40 is not specifically limited and can be set according to the number and arrangement of the coating assembly 20.

In some embodiments, the member to be coated 200 includes a first surface aa and a second surface bb in its own thickness direction, at least one group of coating assembly 20 is located between the first section 210 and the second section 220 and is configured to apply the powder 300 to the surface of the first section 210 on side facing the second section 220, or it can be understood as applying the powder 300 to the first surface aa. At least one group of coating assembly 20 is located on the side of the second section 220 away from the first section 210 and is configured to apply the powder 300 to the surface of the second section 220 away from the first section 210, or it can be understood as applying the powder 300 to the second surface bb.

In the coating device provided by the embodiment of the present application, by providing a plurality of reversing rollers 40 and limiting the position setting of the plurality of coating assemblies 20, the coating device facilitates the laying of the powder 300 on two different surfaces of the member to be coated 200 and facilitates the formation of a double-layer coating.

In some optional embodiments, in the coating device provided by the embodiment of the present application, the composite assembly 30 includes an oven 31 and an extrusion roller 32. The oven 31 is configured to heat the member to be coated 200 and the powder 300 laid on the member to be coated 200, so that the powder 300 can be thermally compounded with the member to be coated 200. The extrusion roller 32 is provided at a downstream position of the oven 31, and the extrusion roller 32 is configured to extrude the member to be coated 200 and the powder 300 after being thermally compounded.

In the coating device provided by the embodiment of the present application, the composite assembly 30 adopts the above structural form, which is conducive to the connection between the powder 300 laid on the member to be coated 200 and the member to be coated 200, ensuring the connection strength of the two and meeting the forming requirements of the coating on the member to be coated 200.

Finally, it should be noted that the above embodiments are only used to illustrate the technical solution of the present application and do not to limit it; Although detailed explanations have been provided for the present application with reference to the aforementioned embodiments, those skilled in the art should understand that they can still modify the technical solutions disclosed in the aforementioned embodiments, or equivalently replace some or all of their technical features; And these modifications or replacements do not make the essence of the corresponding technical solutions separate from the scope of the technical solutions in each embodiment of the present application, and they should all be covered within the scope of the claims and specifications of the present application. Especially, as long as there is no structural conflict, the various technical features mentioned in each embodiment can be combined in any way. The present application is not limited to specific embodiments disclosed herein, but includes all technical solutions falling within the scope of the claims.

What is claimed is:

1. A coating device for applying a coating to a member to be coated, comprising:
    a roller assembly, comprising a first spool and a second spool that are spaced apart from each other, the first spool being configured to release the member to be coated, and the second spool being configured to roll up the member to be coated after being coated with the coating;
    a coating assembly, arranged at a downstream position of the first spool and an upstream position of the second spool, the coating assembly comprising an electrostatic roller set and an electrostatic rod, the electrostatic roller set being at least partially rotatable and configured to electrostatically adsorb a powder, and the electrostatic rod being configured to provide an electrostatic adsorption force to the powder on the electrostatic roller set, so that the powder is peeled off from the electrostatic roller set and laid on the member to be coated; and
    a composite assembly, arranged at a downstream position of the coating assembly, the composite assembly being configured to connect the powder that is laid on the member to be coated with the member to be coated to form the coating connected to the member to be coated.

2. The coating device according to claim 1, wherein the coating assembly further comprises a scraper configured to scrape off excess powder on the electrostatic roller set.

3. The coating device according to claim 2, wherein a gap between the scraper and the electrostatic roller set is adjustable.

4. The coating device according to claim 2, wherein the electrostatic roller set comprises a charging roller and an adsorption roller, the charging roller is configured to release static electricity and make the adsorption roller carry the static electricity, the adsorption roller is rotatable and is configured to electrostatically adsorb the powder, and a feeding gap through which the member to be coated passes is formed between the adsorption roller and the electrostatic rod.

5. The coating device according to claim 4, wherein the coating assembly further comprises a material box for holding the powder, and the material box comprises an opening arranged towards the adsorption roller.

6. The coating device according to claim 5, wherein the material box and the scraper are distributed at intervals in a circumferential direction of the adsorption roller, and the material box is provided at an upstream position of the scraper in a rotational direction of the adsorption roller.

7. The coating device according to claim 5, wherein the charging roller is located at an upstream position of the material box in a rotational direction of the adsorption roller.

8. The coating device according to claim 4, wherein the coating assembly further comprises an aggregate member configured to collect the powder scraped off from the electrostatic roller set, and the aggregate member is spaced apart from the scraper.

9. The coating device according to claim 8, wherein the coating device further comprises a material removal member configured to remove residual powder on the adsorption roller, and the material removal member is located at downstream position of the electrostatic roller and abuts against the adsorption roller in the rotational direction of the adsorption roller.

10. The coating device according to claim 1, further comprising two or more groups of coating assemblies, wherein at least one group of coating assembly is configured to apply the powder to a surface of the member to be coated in a thickness direction, and at least one group of coating assembly is configured to apply the powder to another surface of the member to be coated in the thickness direction.

11. The coating device according to claim 10, further comprising a plurality of reversing rollers for bending the member to be coated to form at least a first section and a second section that are spaced apart from each other and arranged in parallel, and the plurality of reversing rollers are distributed at intervals along a predetermined trajectory;
   at least one group of coating assembly is located between the first section and the second section and is configured to apply the powder to a surface of the first section on a side facing the second section, and at least one group of coating assembly is located on a side of the second section away from the first section and is configured to apply the powder to a surface of the second section away from the first section.

12. The coating device according to claim 1, wherein the composite assembly comprises an oven and an extrusion roller, the oven is configured to heat the member to be coated and the powder laid on the member to be coated, so that the powder is thermally compounded with the member to be coated, the extrusion roller set is arranged at downstream position of the oven, and the extrusion roller set is configured to extrude the member to be coated and the powder after being thermally compounded.

13. A method comprising:
   applying a coating to a member to be coated using a coating device, wherein the coating device comprises:
   a roller assembly, comprising a first spool and a second spool that are spaced apart from each other, the first spool being configured to release the member to be coated, and the second spool being configured to roll up the member to be coated after being coated with the coating;
   a coating assembly, arranged at a downstream position of the first spool and an upstream position of the second spool, the coating assembly comprising an electrostatic roller set and an electrostatic rod, the electrostatic roller set being at least partially rotatable and configured to electrostatically adsorb a powder, and the electrostatic rod being configured to provide an electrostatic adsorption force to the powder on the electrostatic roller set, so that the powder is peeled off from the electrostatic roller set and laid on the member to be coated; and
   a composite assembly, arranged at a downstream position of the coating assembly, the composite assembly being configured to connect the powder that is laid on the member to be coated with the member to be coated to form the coating connected to the member to be coated.

14. The method according to claim 13, wherein the coating assembly further comprises a scraper configured to scrape off excess powder on the electrostatic roller set.

15. The method according to claim 14, wherein a gap between the scraper and the electrostatic roller set is adjustable.

16. The method according to claim 14, wherein the electrostatic roller set comprises a charging roller and an adsorption roller, the charging roller is configured to release static electricity and make the adsorption roller carry the static electricity, the adsorption roller is rotatable and is configured to electrostatically adsorb the powder, and a feeding gap through which the member to be coated passes is formed between the adsorption roller and the electrostatic rod.

17. The method according to claim 16, wherein the coating assembly further comprises a material box configured to hold the powder, and the material box comprises an opening arranged towards the adsorption roller.

18. The method according to claim 17, wherein the material box and the scraper are distributed at intervals in a circumferential direction of the adsorption roller, and the material box is provided at an upstream position of the scraper in a rotational direction of the adsorption roller.

19. The method according to claim 17, wherein the member to be coated is integral to a battery cell.

20. A method for manufacturing a battery module comprising:
   applying a coating to a member of a battery cell of the battery module using a coating device, wherein the coating device comprises:
   a roller assembly, comprising a first spool and a second spool that are spaced apart from each other, the first spool being configured to release the member to be coated, and the second spool being configured to roll up the member to be coated after being coated with the coating;
   a coating assembly, arranged at a downstream position of the first spool and an upstream position of the second spool, the coating assembly comprising an electrostatic roller set and an electrostatic rod, the electrostatic roller set being at least partially rotatable and configured to electrostatically adsorb a powder, and the electrostatic rod being configured to provide an electrostatic adsorption force to the powder on the electrostatic roller set, so that the powder is peeled off from the electrostatic roller set and laid on the member to be coated; and
   a composite assembly, arranged at a downstream position of the coating assembly, the composite assembly being configured to connect the powder that is laid on the member to be coated with the member to be coated to form the coating connected to the member to be coated.

\* \* \* \* \*